United States Patent Office 3,211,752
Patented Oct. 12, 1965

3,211,752
CROSS-LINKING POLYMERS
David S. Breslow, Wilmington, Del., assignor to Hercules Powder Company, Wilmington, Del., a corporation of Delaware
No Drawing. Filed Feb. 12, 1962, Ser. No. 172,815
3 Claims. (Cl. 260—349)

This invention relates to cross-linking polymers, to the vulcanizates so produced, and to new cross-linking agents. More particularly, the invention relates to new azidoformate cross-linking agents and their use in cross-linking polymers.

In the past industry has depended almost entirely upon sulfur or sulfur-bearing materials as vulcanizing, i.e., cross-linking agents. It has more recently been discovered that certain types of organic peroxides or azo compounds are capable of acting as vulcanizing agents. However, all of the above agents suffer the drawback that because of their mode of action they are not equally effective in cross-linking all types of polymers. For example, polybutadiene is effectively vulcanized by peroxides while butyl rubber or crystalline polypropylene are not.

Now in accordance with this invention it has unexpectedly been found that a number of polymers can be crosslinked by nonvolatile azidoformate compounds to produce vulcanizates that are tough, resilient, solvent resistant, and odor free.

The new azidoformates of this invention are solids or oils having a boiling point of at least about 100° C. at a pressure of 70 mm. of mercury and have the general formula $$R(O\overset{O}{\underset{\|}{C}}N_3)_x$$

where $x$ is at least 1, preferably from about 1 to about 100, and R is an organic radical, inert to cross-linking reactions, containing at least one carbon atom per azidoformate group. Exemplary of the new azidoformates of this invention are the alkyl azidoformates such as n-octadecyl azidoformate, tetramethylene-bis(azidoformate), pentamethylene-bis(azidoformate); the cyclic alkyl azidoformates such as 2-(1-p-menthyl-8-yloxy) ethyl azidoformate; the aromatic azidoformates such as phenyl azidoformate, α,α'-p-xylylene-bis(azidoformate), 2,2-isopropylidene-bis(p,p'-phenyl azidoformate); the azidoformate ethers such as 2,2'-oxydiethyl-bis(azidoformate), 2,2'-oxydipropyl-bis(azidoformate), 2,2'-ethylenedioxydiethyl-bis(azidoformate), the tetraazidoformate of pentaerythritol-propylene oxide adduct having the general formula $$C(CH_2-O-CH_2\overset{CH_3}{\underset{|}{CH}}-O-\overset{O}{\underset{\|}{C}}N_3)_4$$

the azidoformate thioethers such as 2,2'-thiodiethyl-bis (azidoformate), 4,4'-thiodibutyl-bis(azidoformate); etc. It will, of course, be obvious to those skilled in the art that still other azidoformates containing functional groups, which are inert to cross-linking reactions, such as halogen, COOR, $$-\overset{O}{\underset{\|}{C}}-$$

etc., groups, are included in the above definition. Most of these azidoformates are relatively insensitive to impact and are sweet-smelling, colorless, solids or oils.

The azidoformates of this invention can be prepared in various ways as, for example, by reacting a chloroformate with an excess, i.e., from about 1.05 moles to about 10 moles per equivalent of chloroformate, of an alkali azide. This reaction can be shown by the following equation $$R(O\overset{O}{\underset{\|}{C}}Cl)_x \xrightarrow{NaN_3} R(O\overset{O}{\underset{\|}{C}}N_3)_x$$

where R and $x$ are as defined above. The chloroformates are well known materials whose preparation is described in the chemical literature.

Before describing the invention in greater detail, the following examples are presented to illustrate the preparation of the new azidoformates, all parts and percentages being by weight unless otherwise indicated.

EXAMPLE 1

To a solution of 65 parts of sodium azide in 150 parts of water was added dropwise with vigorous agitation 54 parts of tetramethylene-bis(chloroformate) dissolved in 370 parts of chloroform. The reaction mixture was agitated vigorously and maintained at room temperature for approximately three days. Then the chloroform layer was separated and washed several times with water to remove any water-soluble impurities. The chloroform solution was dried over magnesium sulfate and sodium sulfate. The azidoformate product was isolated by removing the chloroform under vacuum. Tetramethylene-bis(azidoformate) was obtained as an oil which solidified while standing at room temperature and had a melting point of 30.0–31.2° C. The yield was 96.3% of theoretical, and the product was calculated to be 100% pure, based on the liberation of nitrogen upon decomposition of the azidoformate in diphenyl ether at a temperature of 133° C. Analysis for per cent carbon, hydrogen, oxygen and nitrogen gave the following figures:

|   | Found | Calculated for $C_6H_8N_6O_4$ |
|---|---|---|
| C | 31.57 | 31.58 |
| H | 3.27 | 3.53 |
| O | 28.19 | 28.05 |
| N | 37.05 | 36.84 |

EXAMPLE 2

To a solution of 13 parts of sodium azide in 30 parts of water was added dropwise with vigorous agitation 10 parts of 2,2'-oxydiethyl-bis(chloroformate) dissolved in approximately 60 parts of chloroform. The reaction mixture was agitated vigorously and maintained at room temperature for 20 hours. Then the azidoformate was isolated as described in Example 1. The 2,2'-oxydiethyl-bis(azidoformate) was obtained in a yield of 92.5% of theoretical. It was a white crystalline solid having a melting point of 47.6–48.4° C. Analysis for per cent carbon, hydrogen and nitrogen gave the following figures:

|   | Found, percent | Calculated for $C_6H_8N_6O_5$, percent |
|---|---|---|
| C | 29.7 | 29.5 |
| H | 3.1 | 3.3 |
| N | 33.0 | 34.4 |

EXAMPLE 3

To a solution of 6.5 parts of sodium azide in 15 parts of water was added dropwise with vigorous agitation 16.7 parts of n-octadecyl chloroformate in 149 parts of chloroform. The reaction mixture was agitated vigorously and maintained at room temperature for approximately three days. Then the azidoformate product was isolated as described in Example 1. The n-octadecyl azidoformate was obtained in a yield of 97% of theoretical. It was a white crystalline solid having a melting point of 37.8–38.8° C. Anaylsis for percent carbon, hydrogen, nitrogen and oxygen gave the following figures:

|   | Found, percent | Calculated for $C_{19}H_{37}N_3O_2$, percent |
|---|---|---|
| C | 67.5 | 64.2 |
| H | 11.1 | 11.0 |
| N | 12.2 | 12.4 |
| O | 9.1 | 9.4 |

EXAMPLE 4

To a solution of 13 parts of sodium azide in 30 parts of water was added dropwise with vigorous agitation 13.2 parts of α,α'-p-xylylene-bis(chloroformate) in 149 parts of chloroform. The reaction mixture was agitated vigorously and maintained at room temperature for approximately four days. Then the azidoformate product was isolated as described in Example 1. The α,α'-p-xylylene-bis(azidoformate) was obtained as a white solid which after recrystallization from alcohol had a melting point of 69–71° C. The yield was 96% of theoretical. The product was calculated to be 99% pure, based on the liberation of nitrogen upon its decomposition in diphenyl ether at a temperature of 133° C.

EXAMPLE 5

To a solution of 12.5 parts of sodium azide in 30 parts of water was added dropwise with vigorous agitation 17 parts of 2,2-isopropylidene-bis(p,p'-phenyl chloroformate) in 149 parts of chloroform. The reaction mixture was agitated vigorously and maintained at room temperature for approximately four days. Then the azidoformate product was isolated as described in Example 1. The 2,2-isopropylidene - bis(p,p' - phenyl azidoformate) was obtained as a white solid which after recrystallization from alcohol had a melting point of 69.0–70.5° C. The yield was 92% of theoretical. The product was calculated to be 100% pure, based on the liberation of nitrogen upon its decomposition in diphenyl ether at a temperature of 133° C.

Any type of hydrocarbon polymer, including saturated, unsaturated, linear atactic, crystalline, or nonlinear amorphous polymers as, for example, polyethylene, polypropylene, polystyrene, styrene - butadiene rubber, butyl rubber, natural rubber, polybutadiene, polyisobutylene, ethylene - propylene copolymer, cis - 1,4 - polyisoprene, ethylene - propylene - dicyclopentadiene terpolymer, etc., and blends of these polymers with each other or nonhydrocarbons polymers can be cross-linked with any of the new azidoformates provided it has a boiling point of at least about 100° C. at a pressure of 70 mm. of mercury. In addition to the hydrocarbon polymers, a larger number of nonhydrocarbon polymers can also be cross-linked with the new azidoformates. Typical of the nonhydrocarbon polymers that can be cross-linked in accordance with this invention are the cellulose esters such as cellulose acetate butyrate, the cellulose partial alkyl ethers such as hydroxyethyl and hydroxypropyl cellulose, chlorinated natural rubber, sulfochlorinated polyethylene, poly(vinyl acetate), poly(vinyl chloride), poly(vinylidene chloride), poly(ethyl acrylate), poly (ethylene oxide), poly[3,3-bis(chloromethyl) oxetane], vinyl modified polydimethyl siloxane, polychloroprene, butadiene-acrylonitrile copolymer, etc., and blends of these polymers with each other or hydrocarbon polymers.

The cross-linking process can be carried out by heating the polymer plus the azidoformate compound above its decomposition temperature. This temperature varies over a wide range, but in general, will be in the range of from about 70° C. to about 350° C. Various amounts of cross-linking agent can be added, the optimum amount depending on the amount of cross-linking desired, the specific azidoformate compound employed, etc. For example, in some cases, such as in certain film applications, it may be desirable to merely add a sufficient amount of azidoformate compound to strengthen the polymer without materially affecting its solubility. In general, the amount added, based on the weight of the polymer, will be from about 0.01% to about 20%. In some cases, it may be desirable to add a small amount, i.e., from about 0.01% to about 1.0%, of sulfur which seems to act as a co-agent for the azidoformates.

The cross-linking agent can be incorporated in the polymer in any desired fashion; for example, it can be uniformly blended by simply milling on a conventional rubber mill or dissolved in a solution containing the polymer. By either means the azidoformate compound is distributed throughout the polymer and uniform cross-linking is effected when the blend is subjected to heat. Other means of mixing the cross-linking agent with the polymer will be apparent to those skilled in the art.

In addition to the cross-linking agent, other ingredients can also be incorporated. The additives commonly used in rubber vulcanizates can be used here also, as, for example, extenders, fillers, pigments, plasticizers, stabilizers, etc. Exemplary of the fillers that can be added are calcium carbonate, iron oxide, carbon black, silica, calcium silicate (hydrated), alumina, etc. The presence of a filler, and in particular carbon black, is beneficial and, as in rubber compounding, gives optimum results. Obviously, there are many cases in which a filler is not required or desired, and excellent results are achieved when only the cross-linking agent is added.

The following examples are presented to illustrate the process of cross-linking polymers with the new azidoformates, parts and percentages being by weight unless otherwise specified. In some of the examples the extent of cross-linking is determined by analysis for percent gain in insolubility in solvents in which the uncross-linked polymer was soluble and for the degree of swell therein, hereinafter termed "percent gel" and "percent swell." Percent gel is indicative of the percentage of polymer that is cross-linked and percent swell is inversely proportional to the cross-link density. Percent gel and swell are determined as follows: A weighed sample of cross-linked polymer is soaked in a solvent, in which the uncross-linked polymer was soluble, at an elevated temperature for a specified length of time. The sample is then removed, blotted on filter paper so as to remove the solvent on the surface and weighed at once. The swollen sample is then dried to constant weight. The weights of initial and final sample are corrected for polymer and copolymer content based on knowledge of components.

From these figures $$\frac{\text{Corrected dry weight}}{\text{Corrected initial weight}} \times 100 = \text{Percent gel}$$

$$\frac{\text{Corrected swollen weight} - \text{corrected dry weight}}{\text{Corrected dry weight}} \times 100 = \text{Percent swell}$$

The molecular weight of some of the polymers cross-linked in the examples can be indicated by their Reduced Specific Viscosity (RSV). By the term "Reduced Specific Viscosity" is meant the $\eta_{sp/c}$ determined on an 0.1% solution (0.1 g. of the polymer per 100 ml. of solution) of the polymer at elevated temperature.

EXAMPLES 16–25

Ten samples of different elastomeric polymers were cross-linked with tetramethylene-bis(azidoformate). The formulation of each sample was as follows:

| | Parts |
|---|---|
| Elastomeric polymer | 100 |
| High abrasion furnace black | 50 |
| Tetramethylene-bis(azidoformate) | 5.0 |

Each formulation was compounded on a two roll mill by conventional rubber procedure and then cured in a preheated aluminum mold at a temperature of 155° C. for 45 minutes. The resulting vulcanizates were odorless. The properties of the vulcanizates were determined and are set forth in Table II.

*Table II*

| Examples | Elastomeric Polymer | Tensile Strength, p.s.i. | Modulus at 100% Elongation, p.s.i. | Elongation percent | Shore A Hardness |
|---|---|---|---|---|---|
| 16 | Polyethylene (density 0.923, melt index 2.1, ASTM D 1238). | 2,765 | 2,385 | 135 | 96 |
| 17 | Natural Rubber (smoked sheet) | 3,595 | 415 | 320 | 66 |
| 18 | Cis-1-4-polyisoprene (containing 92.6% of the cis monomer). | 2,800 | 430 | 300 | 67 |
| 19 | Styrene-butadiene copolymer (containing 23.5% of bound styrene). | 2,925 | 430 | 275 | 68 |
| 20 | Isobutylene-isoprene copolymer (containing 2.25 mole percent of isoprene). | 1,275 | 210 | 370 | 47 |
| 21 | Cis-1,4-polybutadiene (containing 91% of the cis monomer). | 1,440 | 520 | 140 | 73 |
| 22 | Butadiene-acrylonitrile copolymer (containing 26 mole percent of acrylonitrile). | 2,985 | 750 | 205 | 69 |
| 23 | Vinyl modified polydimethylsiloxane | 500 | 175 | 215 | 45 |
| 24 | Polychloroprene (sulfur free) | 3,455 | 1,510 | 170 | 79 |
| 25 | Sulfochlorinated polyethylene (containing 29% by weight of chlorine and 1.25% by weight of sulfur, density 1.10). | 2,015 | 1,080 | 165 | 72 |

EXAMPLES 6–15

Ten samples of elastomeric ethylene-propylene copolymers were cross-linked with different azidoformates as follows: In each example the copolymer and azidoformate were codissolved in carbon tetrachloride and then the solvent was allowed to evaporate overnight at room temperature. Each mixture was cured by heating in a closed iron mold for one hour at a temperature of 160° C. The resulting vulcanizates were odorless and had not discolored. The specific azidoformate used, the amount of each azidoformate used, the mole percent of propylene and RSV of the ethylene-propylene copolymer and the percent gel of the resulting vulcanizate, as determined in toluene at 80° C. are tabulated in Table I.

EXAMPLES 26–33

Eight samples of different polymers were cross-linked with tetramethylene-bis(azidoformate). Each sample in the form of flakes was slurried in acetone at a concentration of 1 gram of polymer per ml. of acetone. To each slurry was added the desired amount of azidoformate cross-linking agent dissolved in chloroform. Each mixture was agitated and then the acetone and chloroform removed by evaporation at a temperature of between 50° and 70° C. The resulting dry mixtures were further mixed and blended to thoroughly distribute the azidoformate through the polymers. Each mixture was cured in an aluminum mold at elevated temperature under a pressure of 800 p.s.i. The resulting vulcanizates were

*Table I*

| Example | Mole percent Propylene | RSV* | Azidoformate | Parts/100 Parts of Copolymer | Percent Gel |
|---|---|---|---|---|---|
| 6 | 29 | 4.0 | Tetramethylene-bis(azidoformate) | 7 | 85 |
| 7 | 29 | 4.0 | 2,2'-oxydiethyl-bis(azidoformate) | 5 | 87 |
| 8 | 29 | 4.0 | 2,2'-ethylenedioxydiethyl-bis(azidoformate) | 5 | 81 |
| 9 | 31 | 1.9 | 2,2'-oxydipropyl-bis(azidoformate) | 5 | 83 |
| 10 | 31 | 1.9 | 2,2'-thiodiethyl-bis(azidoformate) | 6 | 76 |
| 11 | 31 | 1.9 | Pentamethylene-bis(azidoformate) | 10 | 88 |
| 12 | 31 | 1.9 | n-Octadecyl azidoformate | 17 | 76 |
| 13 | 31 | 1.9 | α,α'-p-Xylylene-bis(azidoformate) | 5 | 90 |
| 14 | 31 | 1.9 | $C(CH_2-O-CH_2\overset{\underset{\displaystyle CH_3}{\mid}}{CH}-O-\overset{\underset{}{\overset{\displaystyle O}{\parallel}}}{C}N_3)_4$ | 5 | 66 |
| 15 | 31 | 1.9 | 2,2-isopropylidene-bis(p,p'-phenyl azidoformate). | 5 | 89 |

*As determined in decahydronaphthalene at a temperature of 135° C.

odorless. The specific polymers cross-linked, the amounts of azidoformate cross-linking agent used, the time and temperature of the curing cycle, the percent gel and conditions under which the percent gel was determined are set forth in Table III.

EXAMPLE 38

A sample of an ethylene-propylene-dicyclopentadiene terpolymer, containing 64.3 mole percent of ethylene, 33.3 mole percent of propylene and 2.4 mole percent of dicyclopentadiene and having an RSV of 1.9, as determined in decahydronaphthalene at a temperature of 135° C., was cross-linked with 2 parts per hundred of tetramethylene-bis(azidoformate). The azidoformate was incorporated in the terpolymer as described in Examples 6-15 and then the mixture was cured in a closed iron mold at 143° C. for 45 minutes. The resulting vulcanizate was odorless and had not discolored. It has a percent gel of 90 as determined in toluene at a temperature of 80° C.

*Table III*

| Examples | Polymer | Parts of cross-linking agent/100 parts of polymer | Curing Temperature, ° C. | Curing Time, Minutes | Percent Gel | Conditions for Gel determination |
|---|---|---|---|---|---|---|
| 26 | Poly(vinyl chloride) (Sp. Viscosity 0.55, determined on a 4% solution in nitrobenzene at 20° C.). | 5 | 170 | 10 | 84.0 | 4 hours at 50° C. in methylethyl ketone. |
| 27 | Polyethylene (density 0.942, melt index 0.6, ASTM D 1238). | 2 | 170 | 10 | 95.7 | 16 hours at 140° C. in decahydronaphthalene. |
| 28 | Polyethylene (density 0.962, melt index 0.8, ASTM D 1238). | 2 | 170 | 10 | 96.0 | Do. |
| 29 | Polypropylene (density 0.905, birefringent M.P. 167° C.). | 2 | 195 | 5 | 99.0 | Do. |
| 30 | Polymeric 3, 3-bis(chloromethyl)oxetane (birefringent M.P. 186.7° C.). | 5 | 210 | 5 | 91.0 | 16 hours at 100° C. in cyclohexanone. |
| 31 | Poly(ethylene oxide) (RSV 6.3 as determined in chloroform at 25° C.). | 5 | 150 | 30 | 75.5 | 4 hours at 60° C. in water. |
| 32 | Chlorinated natural rubber (67% by weight chlorine, viscosity 130 cp. as determined on a 20% solution in toluene at 25° C.). | 5 | 135 | 70 | 88.0 | 4 hours at 25° C. in a mixture of 2 parts benzene and 1 part n-hexane. |
| 33 | Hydroxyethyl cellulose (degree of substitution 2.5). | 5 | 150 | 30 | 64.2 | 4 hours at 60° C. in water. |

EXAMPLES 34-37

Four examples of different polymers were cross-linked with tetramethylene-bis(azidoformate). Each polymer was dissolved in an organic solvent and the desired amount of tetramethylene-bis(azidoformate) dissolved in chloroform was added with agitation. The specfic polymers, their organic solvents and the amounts of azidoformate cross-linking agent added are tabulated below:

| Ex. | Polymer | Organic Solvent | Parts of crosslinking agent/100 parts of polymer |
|---|---|---|---|
| 34 | Poly(vinyl acetate) (viscosity 900 cp. as determined on a molar solution in benzene at 25° C.). | Methanol | 5 |
| 35 | Polystyrene (mol. wt. 300,000). | Benzene | 2 |
| 36 | Poly(ethyl acrylate) (RSV 1.86 as determined in ethylene dichloride at 25° C.). | Methylethyl ketone. | 2 |
| 37 | Cellulose acetate butyrate (containing 13% acetyl and 37% butyryl). | Acetone | 5 |

The above solutions were agitated automatically for 16 hours and then the solvents were removed by evaporation at a temperature of between 50° and 70° C. Each sample was cured in an aluminum mold at elevated temperature under pressure of 800 p.s.i. The resulting vulcanizates were odorless. The specific polymers crosslinked, the time and temperature of the curing cycle, the percent gel and conditions under which the percent gel was determined are set forth in Table IV.

EXAMPLES 39-40

Two samples of a polyisobutylene having a molecular weight of 100,000 were cross-linked with tetramethylene-bis(azidoformate). The formulation of each sample was as follows:

| | Examples | |
|---|---|---|
| | 39 | 40 |
| Polyisobutylene, parts | 100 | 100 |
| High abrasion furnace black, parts | 50 | 50 |
| Tetramethylene-bis(azidoformate), parts | 2.5 | 2.5 |
| Sulfur, parts | | 1.0 |

Each formulation was compounded on a two roll mill at a temperature of 27° C. for 25 minutes and then cured at 155° C. for 45 minutes in a closed iron mold. The resulting vulcanizates were odorless. The gel and swell per-

*Table IV*

| Examples | Polymers | Curing Temperature, ° C. | Curing Time, Minutes | Percent Gel | Conditions for Gel determination |
|---|---|---|---|---|---|
| 34 | Poly(vinyl acetate) | 170 | 10 | 97.5 | 4 hours at 60° C. in ethylene dichloride. |
| 35 | Polystyrene | 150 | 30 | 95.0 | 16 hours at 25° C. in benzene. |
| 36 | Poly(ethyl acrylate) | 170 | 10 | 87.6 | 4 hours at 60° C. in methylethyl ketone. |
| 37 | Cellulose acetate butyrate | 150 | 25 | 85.0 | 4 hours at 25° C. in acetone. | centages were determined in toluene at a temperature of 80° C. and are tabulated below:

|  | Examples ||
|---|---|---|
|  | 39 | 40 |
| Percent gel | 100 | 100 |
| Percent swell | 355 | 237 |

EXAMPLE 41

A blend of natural rubber and an ethylene-propylene copolymer containing 40 mole percent propylene and having an RSV of 2.3 as determined in decahydronaphthalene at a temperature of 135° C., were covulvanized. The following ingredients were compounded on a two roll mill at a temperature of from 70–75° C. for 20 minutes.

|  | Parts |
|---|---|
| Natural rubber (smoked sheet) | 50 |
| Ethylene-propylene copolymer | 50 |
| High abrasion furnace black | 51 |
| Tetramethylene-bis(azidoformate) | 1.5 |
| Sulfur | 0.175 |

The resulting mixture was cured in a closed iron mold at a temperature of 155° C. for 30 minutes. The resulting vulcanizate was odorless. The properties of the vulcanizate were as follows:

| Tensile Strength, p.s.i. | Modulus at 300% Elongation, p.s.i. | Elongation, Percent | Shore A Hardness | Break Set, Percent |
|---|---|---|---|---|
| 2,880 | 1,725 | 400 | 66 | 10 |

EXAMPLES 42–43

Two samples of an ethylene-propylene copolymer, containing 40 mole percent propylene and having an RSV of 2.3, as determined in decahydronaphthalene at a temperature of 135° C., were cross-linked with tetramethylene-bis(azidoformate). The formulation of each example was as follows:

|  | Examples ||
|---|---|---|
|  | 42 | 43 |
| Ethylene-propylene copolymer | 100 | 100 |
| High abrasion furnace black | 45 | 45 |
| Tetramethylene-bis(azidoformate) | 10 | 10 |
| Sulfur | 0 | 0.5 |

The ingredients were compounded on a two roll mill at a temperature of 38° C. for 30 minutes and then cured in a preheated mold at a temperature of 155° C. for 45 minutes. The resulting vulcanizates were odorless. The tensile strength of each vulcanizate is tabulated below:

|  | Examples ||
|---|---|---|
|  | 42 | 43 |
| Tensile strength, p.s.i. | 2,895 | 3,320 |

EXAMPLE 44

A sample of an ethylene-propylene copolymer, containing 32 mole percent propylene and having an RSV of 2.1 as determined in decahydronaphthalene at a temperature of 135° C., was cross-linked with 5 parts per hundred of 2-(1-p-menthyl-8-yloxy) ethyl azidoformate. The copolymer and azidoformate cross-linking agent were compounded on a two roll mill at a temperature of from 60–75° C. The resulting mixture was cured in a preheated compression type mold at a temperature of 150° C. for 45 minutes. The resulting vulcanizate had a pleasant pine odor and had not discolored. It had a percent gel of 79 as determined in toluene at a temperature of 80° C.

EXAMPLES 45–48

Adhesive compositions were prepared from an atactic polypropylene having an RSV of 2.25 and an amorphous ethylene-propylene copolymer containing 33 mole percent propylene and having an RSV of 2.2. In each case RSV was determined in decahydronaphthalene at a temperature of 135° C. The formulation of each example was as follows:

|  | Examples ||||
|---|---|---|---|---|
|  | 45 | 46 | 47 | 48 |
| Polypropylene, parts | 100 | 100 |  |  |
| Ethylene-propylene copolymer, parts |  |  | 100 | 100 |
| n-Heptane, parts | 700 | 700 | 700 | 700 |
| Mixed tetra-, di-, and dehydroabietyl alcohols, parts | 200 | 200 | 200 | 200 |
| Tetramethylene-bis(azidoformate), parts | 10 |  | 10 |  |

The dry ingredients were codissolved in the n-heptane with agitation at room temperature. Each adhesive composition was tested by bonding compression molded 120-mil sheets of crystalline polypropylene (RSV 3.25 as determined in decahydronaphthalene at a temperature of 135° C.) as follows: From the crystalline polypropylene sheets were cut 1 by 2 inch specimens. Each specimen was swabbed with heptane and then coated with 50 mils (wet) of adhesive composition. The coated specimens were air dried at room temperature for 5 minutes, then at a temperature of 80° C. for 10 minutes and again at room temperature for 30 minutes. Contact bonds were formed by overlapping two coated surfaces 1 square inch under a pressure of 5 p.s.i. and a temperature of 133° C. for two hours. The bonded specimens were conditioned for one hour at room temperature (still under a pressure of 5 p.s.i.) and then tested for lap shear bond strength and creep. The results of the tests are tabulated below:

|  | Examples ||||
|---|---|---|---|---|
|  | 45 | 46 | 47 | 48 |
| Lap shear bond strength,[a] p.s.i. | 390 | 60 | 145 | 20. |
| Creep [b] | >2 weeks [c] | 3.5 min | >2 weeks [c] | 3.0 min. |

[a] Measured by ASTM D 1002 using an Instron tester at a loading rate of 20 inches per minute.
[b] Measured by loading bonded specimens in tension with 500 grams dead weight at a temperature of 80° C. and noting the time to bond failure.
[c] Discontinued after 2 weeks with no visible evidence of bond failure.

EXAMPLE 49

A sample of the poly(ethylene oxide) described in Example 31 was treated with 2 parts per hundred of tetramethylene-bis(azidoformate). The azidoformate was incorporated in the polymer and the mixture cured as described in Example 31. A control sample of the poly(ethylene oxide) was cured in the same way except no azidoformate was added. The two samples thus cured were examined for strength and solubility. Both samples were clear films of approximately 5 mils thickness. The untreated sample had a tendency to be brittle and break easily while the treated sample had a greater elongation capacity and was considerably stronger. Both samples dissolved in water at 50° C., the treated sample leaving only a slight residue of insoluble material. It can be seen from the above example that azidoformate cross-linking agents can be used to impart strength to films without materially affecting their solubility, thus demonstrating utility in the field of water packaging applications.

What I claim and desire to protect by Letters Patent is:

1. A monoazidoformate having the formula

where R is a radical selected from the group consisting of alkyl and cycloalkyl-oxy-alkyl radicals containing 10 to 18 carbon atoms.

2. n-Octadecyl azidoformate.
3. 2-(1-p-menthyl-8-yloxy)ethyl azidoformate.

References Cited by the Examiner

UNITED STATES PATENTS

| | | | |
|---|---|---|---|
| 2,764,599 | 9/56 | Clifford et al. | 260—349 |
| 2,865,932 | 12/58 | MacMullen et al. | 260—349 |
| 2,877,211 | 3/59 | Nitzsche et al. | 260—46.5 |
| 3,002,003 | 9/61 | Merrill et al. | 260—46.3 |
| 3,032,528 | 5/62 | Nitzsche et al. | 260—46.5 |

OTHER REFERENCES

Forster et al., J. Chem. Soc., vol. 93, p. 81 (1908).

WALTER A. MODANCE, *Primary Examiner.*

JOSEPH R. LIBERMAN, NICHOLAS S. RIZZO,
*Examiners.*